Patented June 1, 1948

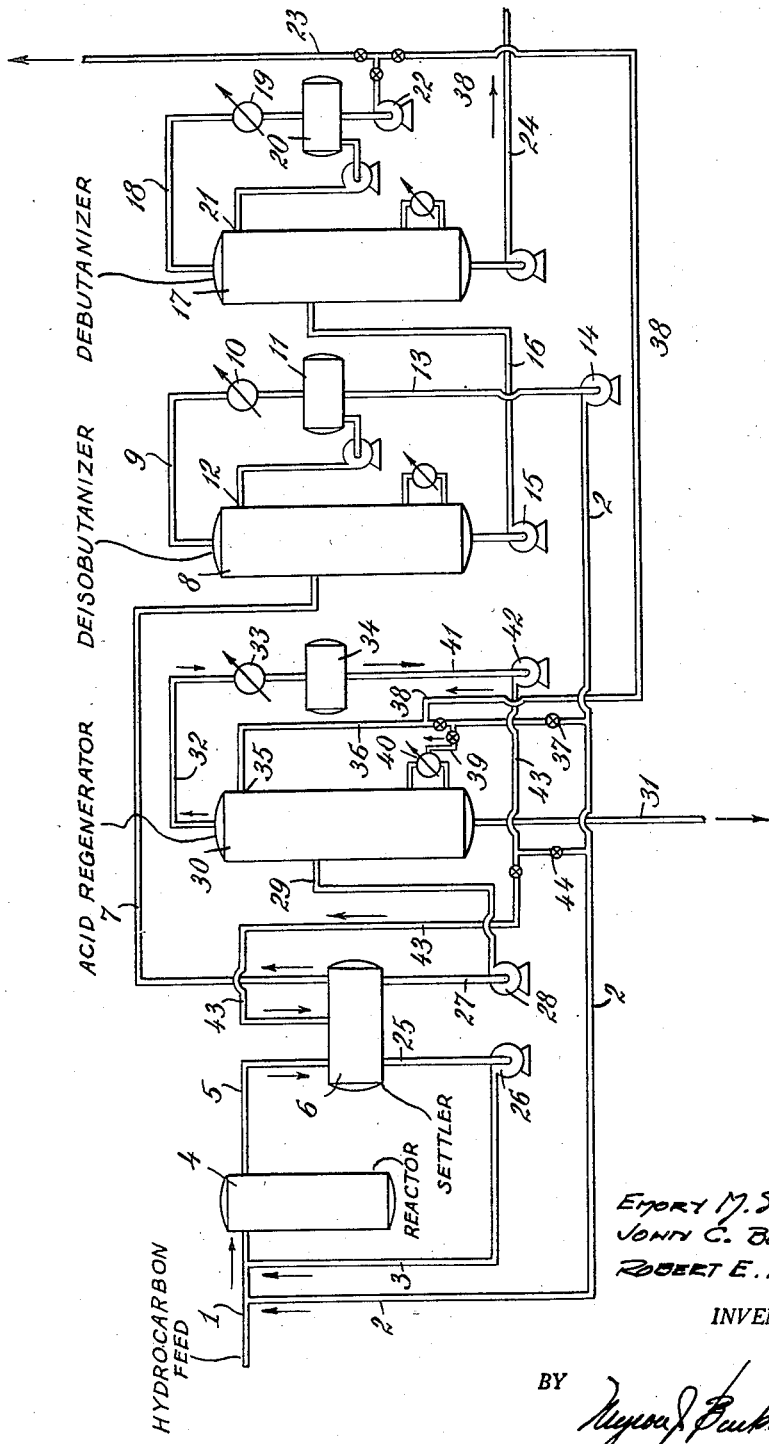

2,442,666

UNITED STATES PATENT OFFICE 2,442,666

METHOD OF REGENERATING HF CATALYST IN AN ALKYLATION PROCESS

Emory M. Skinner, Augusta, Kans., Robert E. Redfield, Merion Station, Pa., and John C. Bolinger, San Marino, Calif., assignors to Socony-Vacuum Oil Company, Incorporated, New York, N. Y., a corporation of New York Application May 14, 1943, Serial No. 486,954

4 Claims. (Cl. 260—683.4)

This invention has to do with processes for the alkylation of paraffine hydrocarbons with olefines, such as the alkylation of isobutane with butene to form iso-octane, and particularly with such processes wherein the catalyst used is hydrofluoric acid.

In such processes the general scheme of operation is one wherein a hydrocarbon feed stream containing reactants in approximately reaction proportions is contacted with the catalyst in a contactor and the reaction mixture passes to a settler wherein a hydrocarbon phase and an acid catalyst phase separate. The acid catalyst phase contains certain dissolved hydrocarbons, and also, in the course of time builds up a content of certain "polymerized" hydrocarbons whose presence in the process is not desirable and so a small portion of the acid phase is subjected to some form of cleaning up or regeneration to prevent the continued presence of these materials in the process. This invention is particularly concerned with the acid regenerating phase of the process.

Using the isobutane-butene reaction as an example with hydrofluoric acid as catalyst, the feed stream to the system will contain isobutane and butenes in about the proportions demanded by the reaction, together with a substantial amount of normal butane. Isobutane in excess being necessary, this feed is blended with an internally recycled stream of isobutane and is then contacted with the catalyst in a liquid-liquid contactor. The reaction mixture passes from the contactor to a settler and separates into an acid phase (below), and a hydrocarbon phase, (above). The hydrocarbon phase is removed, freed of acid, freed of isobutane to be recycled to the contactor, and separated into butane and product both of which are removed from the system. The acid phase is recycled to the contactor. This acid phase contains dissolved unsaturated hydrocarbons. It also contains byproducts of the reaction, generally loosely spoken of as "polymers," some arising probably from intercondensation of the dissolved unsaturates, and probably other by-product materials of various natures. These polymers are not desired in the system, and if allowed to remain not only reduce the effectiveness of the acid but degrade to a heavy product difficult of disposal. It is the practice to remove these and regenerate the acid by withdrawing a portion of the acid phase from the settler and subjecting it to distillation, recovering the polymer as a bottom product to be withdrawn from the system and sending overhead the acid and other hydrocarbons present, which are condensed and returned to the reaction system. It has been found that exposure of the acid phase mixture in the regenerator to temperatures, times, pressures, etc., necessary to accomplish this distillation in itself accelerates many times the formation of polymers, and the present invention has for its object the provision of method whereby this cause of degradation may be alleviated.

To properly understand this invention, reference is made to the drawing attached hereto, the single figure of which shows, in diagram form, an alkylation process in which the present invention is practiced.

In the drawing feed consisting of isobutane and butenes in about the proportions consumed by the process, and also containing butane, enters by pipe 1, to be admixed with internally recycled excess isobutane from pipe 2, and with acid from pipe 3 enters the contactor 4. The reaction mixture from the contactor passes through pipe 5 into settler 6 and there separates into an acid phase and a hydrocarbon phase. The hydrocarbon phase is withdrawn through pipe 7 and fed into still 8 wherein it is freed of isobutane which passes overhead through pipe 9, is condensed at 10, and collected at 11, with a portion returned for still control at 12 and the remainder recycled to process through pipe 13, pump 14, and pipe 2. Bottoms from still 8 pass through pump 15 and pipe 16 to still 17, where butane is removed, which passes overhead through pipe 18, is condensed at 19, and collected at 20, with a portion returned for control at 21 and the remainder discharged from the system through pump 22 and pipe 23. Bottoms product from 17, discharged from the system at 24 constitutes the alkylate product of the system.

Acid phase from settler 6 is recycled to the contactor, in accordance with process demands, by pipe 25, pump 26, and pipe 3.

A smaller portion of the acid phase is withdrawn by pipe 27 and passed by pump 28 through pipe 29 to regenerator 30. Therein it is heated and subjected to distillation under conditions which leave as distillation residue the polymers, which are withdrawn from the still 30 and from the system through pipe 31. The regenerator overhead, consisting of acid, dissolved unsaturates, (these are mostly apparently in the form of organic fluorides), and other hydrocarbons, passes through pipe 32, is condensed at 33, and collected at 34, to be returned to the system. Formerly, it has been the practice to return a portion of this condensate from 34 for control of the regenerator top temperature. It has been found that this repeated exposure of the "fluoride" and hydrocarbon content of the condensate, in the presence of acid, to the regenerator temperatures is responsible for a substantial part of the polymer production. This we avoid, according to this invention, by introducing, at 35, for control of 30, through pipe 36, either isobutane withdrawn by pipe 37 from pipe 2, or butane withdrawn by pipe 38 from pipe 23. Of the two materials, isobutane is preferred, since it is equally inert to regenerator conditions, and enters into the reaction, whereas butane, in the reactor, merely acts as a non-reactive diluent of the reaction mixture. Additionally, a small amount of material from pipe 36 will be introduced by pipes 39 into the reboiler 40, attached to still 30. This will assist in sweeping the polymerizable materials from the regenerator and removing them, with relative speed, from the conditions under which they may pass to degradation products.

Under these conditions, the condensed overhead from regenerator 30, collected in receiver 34, may be returned as usual to the settler 6 through pipe 41, pump 42 and pipe 43. This product consists of acid, containing dissolved unsaturates, and free of polymer. The condensate also contains a substantial proportion of hydrocarbons, particularly the isobutane or butane introduced for regenerator control, and on the whole, the condensate is in condition more apropriate for return to the reaction than to the settler 6, so bypass pipe 44 is provided in order that the condensate may be introduced into pipe 2 to return to contactor 4.

By operating in this manner, a substantial reduction in the amount of degradation of feed to polymer may be obtained.

We claim:

1. In a process for the reaction of hydrocarbons in the presence of hydrofluoric acid, wherein the catalyst is purified by subjecting it to distillation to separate from it as a residue products of undesirable side reactions, the improvement which comprises controlling the distillation by applying thereto, as a wet reflux, a hydrocarbon substantially inert to the catalyst derived from a point within the reaction system and beyond the point of main hydrocarbon reaction.

2. In a process wherein a mixture of butene, butane, and isobutane is contacted with hydrofluoric acid to accomplish reaction between isobutane and butene, in which the product is freed by distillation of isobutane and in which acid withdrawn from the reaction system is distilled to permit the discard therefrom of organic products of side reactions, the steps which comprise distilling the mixture of acid, side products, and associated hydrocarbons to produce side products as a residue for discard and an overhead of purified acid and associated hydrocarbons, and introducing to said distillation, as wet reflux for the control thereof, isobutane separated from the products of reaction.

3. In a process wherein isobutane is reacted with butene in the presence of hydrofluoric acid, the reaction mixture subjected to phase separation, the acid phase recycled to the reactor, the hydrocarbon phase distilled to separate therefrom reaction product for removal from the system and unreacted isobutane for return to the reactor, and a portion of the acid phase is distilled to separate therefrom as a still residue organic products of side reaction for discard from the system, the improvement comprising introducing isobutane separated from the hydrocarbon phase to the acid distillation as wet reflux for the control thereof, condensing the acid-hydrocarbon overhead product of such distillation, and returning the condensate to the reactor in company with recycled isobutane.

4. In a process for the reaction of hydrocarbons in the presence of hydrofluoric acid, wherein the catalyst is purified by subjecting it to distillation to separate from it as a residue products of undesirable side reactions, the improvement which comprises conducting such distillation, controlling the distillation by applying thereto, as a wet reflux, a hydrocarbon substantially inert to the catalyst derived from a point within the reaction system and beyond the point of main hydrocarbon reaction and introducing a small amount of said inert hydrocarbon to the distillation zone to assist in removal of the reactive hydrocarbons therefrom.

EMORY M. SKINNER.
ROBERT E. REDFIELD.
JOHN C. BOLINGER.

REFERENCES CITED

The following references are of record in the file of this patent:

UNITED STATES PATENTS

| Number | Name | Date |
|---|---|---|
| 2,317,901 | Frey | Apr. 27, 1943 |
| 2,320,629 | Matuszak | June 1, 1943 |
| 2,322,800 | Frey | June 29, 1943 |
| 2,372,338 | Penisten | Mar. 27, 1945 |
| 2,387,162 | Matuszak | Oct. 16, 1945 |
| 2,388,919 | Iverson | Nov. 13, 1945 |